United States Patent
Lin et al.

(10) Patent No.: US 9,310,908 B2
(45) Date of Patent: Apr. 12, 2016

(54) COLOR SAMPLING METHOD AND TOUCH CONTROL DEVICE THEREOF

(71) Applicant: HTC Corporation, Taoyuan County (TW)

(72) Inventors: Chia Yen Michael Lin, Taoyuan County (TW); Jing-Lung Wu, Taoyuan County (TW); Hsin-Ti Chueh, Taoyuan County (TW)

(73) Assignee: HTC Corporation, Taoyuan District, Taoyuan (TW)

(*) Notice: Subject to any disclaimer, the term of this patent is extended or adjusted under 35 U.S.C. 154(b) by 279 days.

(21) Appl. No.: 14/067,935

(22) Filed: Oct. 30, 2013

(65) Prior Publication Data

US 2015/0116227 A1  Apr. 30, 2015

(51) Int. Cl.
G06K 9/34 (2006.01)
G06F 3/041 (2006.01)
G06F 3/0488 (2013.01)

(52) U.S. Cl.
CPC ............ G06F 3/041 (2013.01); *G03B 2217/00* (2013.01); *G06F 3/0488* (2013.01)

(58) Field of Classification Search
CPC .................................. G06T 7/00; G06T 11/00
USPC .......................................... 382/164; 345/598
See application file for complete search history.

(56) References Cited

U.S. PATENT DOCUMENTS

| | | | |
|---|---|---|---|
| 4,679,067 A | 7/1987 | Belmares-Sarabia | |
| 4,763,186 A | 8/1988 | Belmares-Sarabia | |
| 4,862,251 A | 8/1989 | Belmares-Sarabia | |
| 7,639,741 B1* | 12/2009 | Holt | G06T 5/50 375/240.08 |
| 7,679,786 B2 | 3/2010 | Scott | |
| 7,956,930 B2 | 6/2011 | Sullivan | |
| 2008/0055616 A1* | 3/2008 | Scott | H04N 1/62 358/1.9 |
| 2012/0201451 A1* | 8/2012 | Bryant | H04N 1/60 382/164 |
| 2012/0299837 A1* | 11/2012 | Benko | G06F 3/0416 345/173 |
| 2013/0243312 A1* | 9/2013 | Sato | G06T 7/0089 382/164 |
| 2014/0055374 A1* | 2/2014 | Bart | G06F 3/0488 345/173 |
| 2014/0111539 A1* | 4/2014 | Allen | G06T 11/001 345/594 |
| 2014/0132568 A1* | 5/2014 | Hirose | G06F 3/016 345/175 |
| 2015/0103093 A1* | 4/2015 | Bryant | G06T 11/001 345/595 |

FOREIGN PATENT DOCUMENTS

| | | |
|---|---|---|
| CN | 101366281 A | 2/2009 |
| CN | 101513035 B | 1/2013 |
| TW | 200630952 | 9/2006 |
| TW | 201325260 | 6/2013 |

OTHER PUBLICATIONS

Notice of Allowance mailed on Aug. 28, 2015 for the Taiwan application No. 103100092, filed Jan. 2, 2014, p. 1-4.

\* cited by examiner

*Primary Examiner* — Stephen R Koziol
*Assistant Examiner* — Delomia L Gilliard
(74) *Attorney, Agent, or Firm* — Winston Hsu; Scott Margo

(57) ABSTRACT

A color sampling method includes detecting a touch input on a touch screen, determining a first region corresponding to the touch input, performing a temporal analysis on the first region of a plurality of image frames to determine representative color values of pixels within the first region, determining a second region within the first region, and performing a spatial analysis on the second region to determine candidate color value corresponding to the touch input according to the representative color values of pixels within the second region.

16 Claims, 5 Drawing Sheets

COLOR SAMPLING METHOD AND TOUCH CONTROL DEVICE THEREOF

BACKGROUND OF THE INVENTION

1. Field of the Invention

The present invention relates to a color sampling method and a touch control device thereof, and more particularly, a color sampling method and a touch control device utilizing the color sampling method.

2. Description of the Prior Art

In certain camera applications installed on a mobile electronic device, an amount of pixels on a to-be-fetched digital photo is sampled under the assumption that negligible noise is introduced when fetching the picture.

However, as a matter of fact, significant noises can be easily introduced from image sensors disposed on the mobile electronic device while taking the digital photo, especially under a lowlight condition and/or a high ISO condition, and it may cause wrong or unreal colors of the real scene fetched on the digital photo. Even if under a moderate lightening condition and/or a low ISO condition that the noises may be slightly reduced, pixel sampling is getting difficult and complicated while taking the digital photo using the camera application on the mobile electronic device.

SUMMARY OF THE INVENTION

An embodiment of the invention discloses a color sampling method. The color sampling method comprises detecting a touch input on a touch screen; receiving a plurality of image frames; determining a first region corresponding to the touch input; determining representative color values of pixels within the first region according to color values of corresponding pixels located at the same positions within the plurality of image frames; determining a second region within the first region; applying weights to pixels within the second region according to a distance relationship relative to the touch input; and determining a candidate color value corresponding to the touch input according to the weights and the representative color values within the second region.

Another embodiment of the invention further discloses a color sampling method. The color sampling method comprises detecting a touch input on a touch screen; determining a first region corresponding to the touch input; performing a temporal analysis on the first region of a plurality of image frames to determine representative color values of pixels within the first region, the image frames being received during a predetermined time period upon detecting the touch input; determining a second region within the first region; and performing a spatial analysis on the second region to determine candidate color value corresponding to the touch input according to the representative color values of pixels within the second region.

Yet another embodiment of the invention further discloses a touch control device. The touch control device comprises a touch screen, configured to receive and detect a touch input; and an image processing unit, coupled to the touch screen and configured to determine a first region and a second region covering the touch input, determining color values of pixels within the first region and the second region by temporal analysis and spatial analysis respectively, and determine a color value corresponding to the touch input according to the color values of pixels in the second region; wherein the second region is a portion of the first region.

These and other objectives of the present invention will no doubt become obvious to those of ordinary skill in the art after reading the following detailed description of the preferred embodiment that is illustrated in the various figures and drawings.

DETAILED DESCRIPTION

For neutralizing the abovementioned defects in sampling pixels, the present invention discloses a color sampling method and a touch control device utilizing the color sampling method. The disclosed color sampling method utilizes temporal analysis and spatial analysis for reducing introduced noises without getting the sampling more complicated. The temporal analysis is performed first on the image for determining representative color values corresponding to the pixels, such as average values. Then the spatial analysis is performed for determining candidate color value by weighting representative color values of pixels within a region centered to a reference pixel. Note that the temporal analysis helps in significantly decreasing a processed data amount in the spatial analysis.

Figure 1:
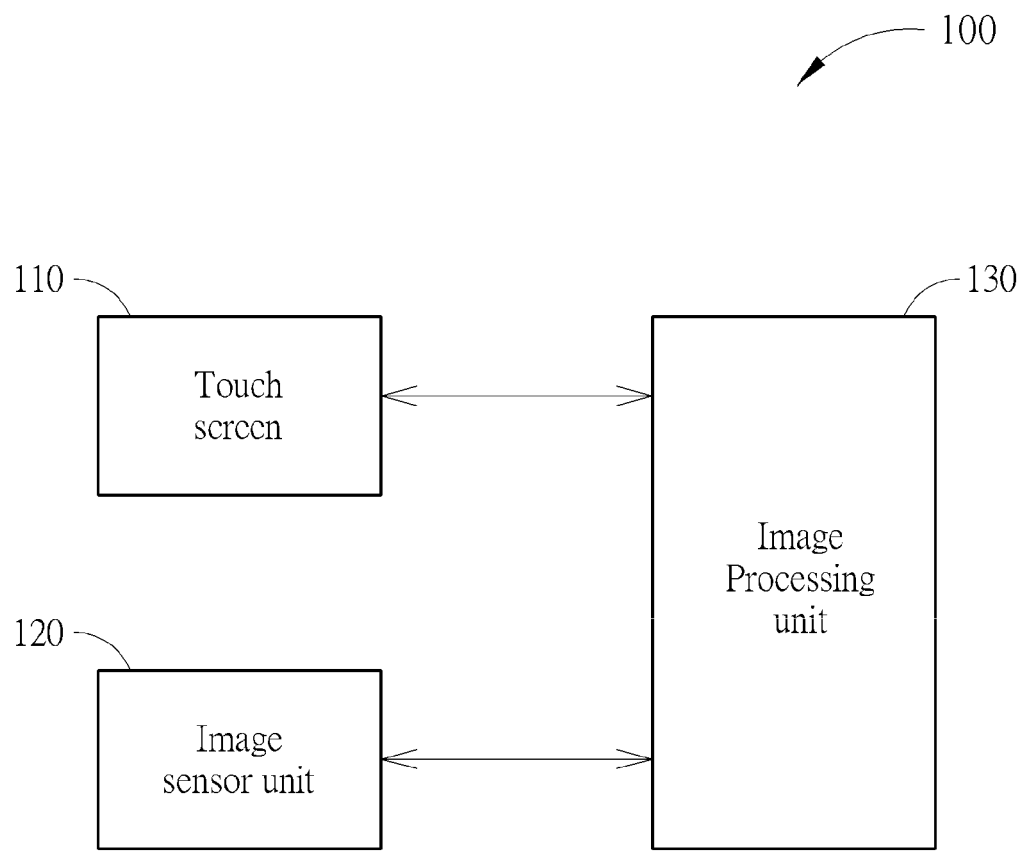
FIG. 1 illustrates a touch control device utilizing the color sampling method of the present invention according to one embodiment of the present invention.

Please refer to FIG. 1, which illustrates a touch control device 100 utilizing the color sampling method according to one embodiment of the present invention. As shown in FIG. 1, the touch control device 100 comprises a touch screen 110, an image sensor unit 120, and an image processing unit 130. The touch screen 110 is configured to display at least an image for user's preview and to receive a touch input corresponding to a position within the image from the user. The image sensor unit 120 is configured to receive and capture a plurality of image frames corresponding to at least one scene. The image processing unit 130 is coupled to the touch screen 110 and the image sensor unit 120. The image processing unit 130 is configured to receive the image frames from the image sensor unit 120, perform various processing on the image frames, and provide the image frames to the touch screen 110 for preview. The image processing unit 130 is further configured to receive touch input information received from the touch screen 110 and perform color sampling based on the touch input information.

Specifically, the image sensor unit 120 may capture a plurality of image frames corresponding to a scene. The image processing unit 130 receives the plurality of image frames and provides the image frames to the touch screen 110. In embodiments of the present invention, the image processing unit 130 further comprises a buffer (not shown) for temporarily storing the plurality of image frames. The buffer may be capable to buffer a predetermined number of image frames. User may send inputs via the touch screen 110 for performing various operations on the image frames. In embodiments of the present invention, user may tap on an object within the scene of the image frames for performing color adjustment on the object. In this case, the touch screen 110 detects the touch input and determines the position of the touch input. The touch screen 110 then transmits information related to the touch input to the image processing unit 130. The information related to the touch input may comprise at least position of the touch input, and/or operation to be performed, etc. Upon receiving the information, the image processing unit 130 determines reference position corresponding to the touch input within the image frames, and performs color sampling on pixels nearby the reference position to determine a color corresponding to the touch input.

The image processing unit 130 may perform, among others, a temporal analysis and a spatial analysis on image frames received from the image sensor unit 120. Specifically, the image processing unit 130 performs the temporal analysis and spatial analysis on a number of image frames during a time period upon receiving the touch input. In one embodiment of the invention, the image sensor unit 120 captures image frames and the image processing unit 130 provides the image frames on the touch screen 110 for preview in real-time. Furthermore, the image processing unit 130 determines a first region for performing the temporal analysis with the image frames. The first region is located around the reference position of the touch input by a predetermined size. For example, the first region may be a region of M×N pixels centered to the reference position. Then the image processing unit 130 performs the temporal analysis for determining representative color value of each of the pixels within the first region. The representative color value may be determined by, for example, calculating average color value of corresponding pixels located at the same position within the image frames. In other embodiments of the invention, the average color value may be calculated by selecting the median color value or mean color value of corresponding pixels located at the same position. Yet in another embodiment of the invention, the temporal analysis may be performed by filtering out certain color values. For example, maximum and/or minimum color values among the corresponding pixels located at the same position may be excluded from calculation. Other algorithms may also be used for performing the temporal analysis without departing from the spirit of the invention.

Representative color values of each of the pixels within the first region may be determined according to above. Subsequently, the image processing unit 130 performs spatial analysis on at least a portion of the pixels within the first region, for example a second region P×Q in which P≤M and Q≤N. Please note that the second region is also located around the reference position corresponding to the touch input. In embodiments of the invention, the image processing unit 130 performs the temporal analysis for determining candidate color value of the second region. The candidate color value can be determined by calculating weighted average of the representative color values of pixels within the second region. In embodiments of the invention, the weight value applied to each of the pixels within the second region is determined according to the distance of the pixel to the reference position. In other embodiments of the invention, the weight value may be determined by the distribution of the representative color values and/or other algorithm without departing from the spirit of the invention. Once the candidate color value is determined, the image processing unit 130 may perform operation corresponding to the touch input. In embodiments of the invention, the image processing unit 130 may adjust color values of pixels having color values equal or similar to the candidate color value. In other embodiments of the invention, the touch input may correspond to an object. The image processing unit 130 may identify the object and apply new color on the object by adjusting the candidate color value. For example, the user may tap on an object for adjusting color of the object. The candidate color value represents the current color value of the object and user may select another color to replace it. In another embodiment of the invention, user may select two objects having two different colors at the same time or by a predetermined gesture. The image processing unit 130 determines candidate color values of the two objects and exchanges the candidate color values. The image processing unit 130 may apply the color adjustment on later captured image frames and provide the adjusted image frames to the touch screen 110 for preview. Please note that the color sampling and color adjustment may be performed in real-time during preview of the image frames.

Figure 2:
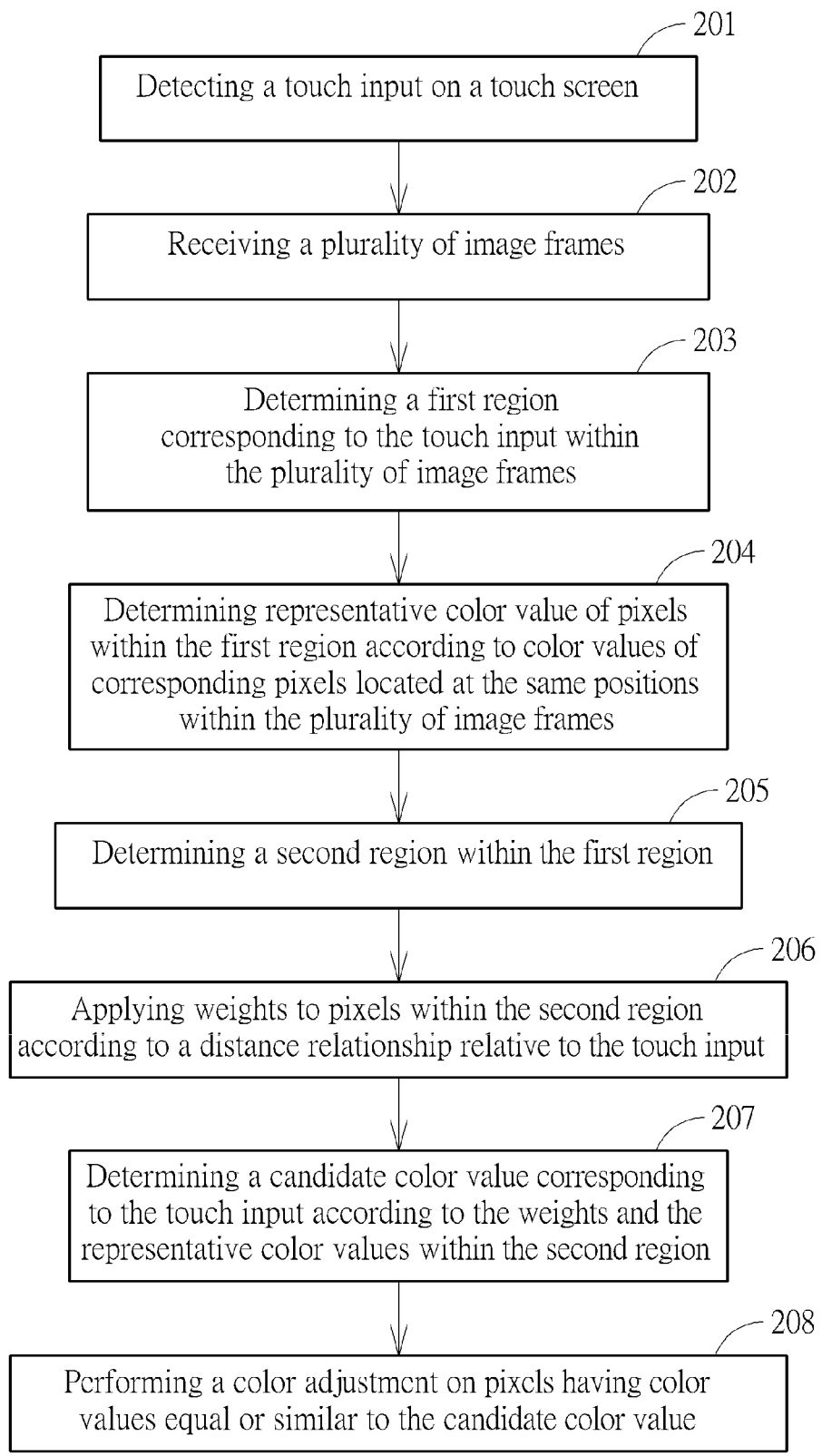
FIGS. 2 and 5 illustrate flowcharts of the color sampling methods according to embodiments of the present invention.

Please refer to FIG. 2, which illustrates a flowchart of the color sampling method according to one embodiment of the present invention. The color sampling method may be implemented in cooperation with the touch control device 100 shown in FIG. 1. As shown in FIG. 2, the color sampling method comprises steps as the following:

Step 201: Detecting a touch input on a touch screen.

Step 202: Receiving a plurality of image frames.

Step 203: Determining a first region corresponding to the touch input within the plurality of image frames.

Step 204: Determining representative color value of pixels within the first region according to color values of corresponding pixels located at the same positions within the plurality of image frames.

Step 205: Determining a second region within the first region.

Step 206: Applying weights to pixels within the second region according to a distance relationship relative to the touch input.

Step 207: Determining a candidate color value corresponding to the touch input according to the weights and the representative color values within the second region.

Step 208: Performing a color adjustment on pixels having color values equal or similar to the candidate color value.

In Step 201, the touch input may correspond to an object or specific pattern of a scene. Upon receiving the touch input, the touch screen determines position of the touch input in the display area, and sends information related to the position of the touch input and corresponding operation to the image processing unit. In Step 202, a plurality of image frames captured by the image sensor unit upon receiving the touch input is received by the image processing unit. In embodiments of the invention, the plurality of image frames may be image frames captured within a predetermined time period or be determined by a predetermined number. For example, the plurality of image frames may be captured within one second or 10 image frames starting from the touch input is received.

In Step 203, a first region is determined according to the position of the touch input by the image processing unit. The first region may be a region of a predetermined size, such as M×N, centered to the position of the touch input. The image processing unit may extract the first region from the plurality of image frames. In Step 204, a representative color of pixels within the first region is determined according to pixel values of the plurality of image frames. For each pixel within the first region, color values of corresponding pixels within the plurality of image frames are calculated according to a predetermined algorithm. The predetermined algorithm may be average calculation, mean calculation, and/or other suitable calculation. In yet another embodiment of the invention, the color values of corresponding pixels may be preprocessed, such as filtering out color values above or below certain thresholds. Accordingly, representative color values of pixels within the first region may be determined.

In Step 205, a second region of a predetermined size within the first region is further determined. The second region may be a region of P×Q, in which P≤M and Q≤N. Similarly, the second region is centered to the position of the touch input. In step 206, each of the pixels within the second region is applied with a weight determined according to a distance relationship relative to the touch input. The distance relationship is determined according to the position of a given pixel to the position of the touch input and can be normalized to a value between 0 and 1. Then in step S207, a candidate color value corresponding to the touch input is determined according to the color values of pixels within the second region and corresponding weights. Last in step S208, color adjustment is performed on pixels having color values the same as or similar to the candidate color value. In embodiments of the invention, color values having difference less than a predetermined threshold to the candidate color value are regarded as similar to the candidate color value. For example, assume the candidate color value is (255, 99, 71), color vales having difference less than 3 for each color channel are regarded as similar. Operation of the color adjustment may be determined according to the information of the touch input. For example, change pixels having color values similar to or the same as the candidate color value to another color value, or swap color values of two objects corresponding to the touch input to candidate color values with each other.

Figure 3:
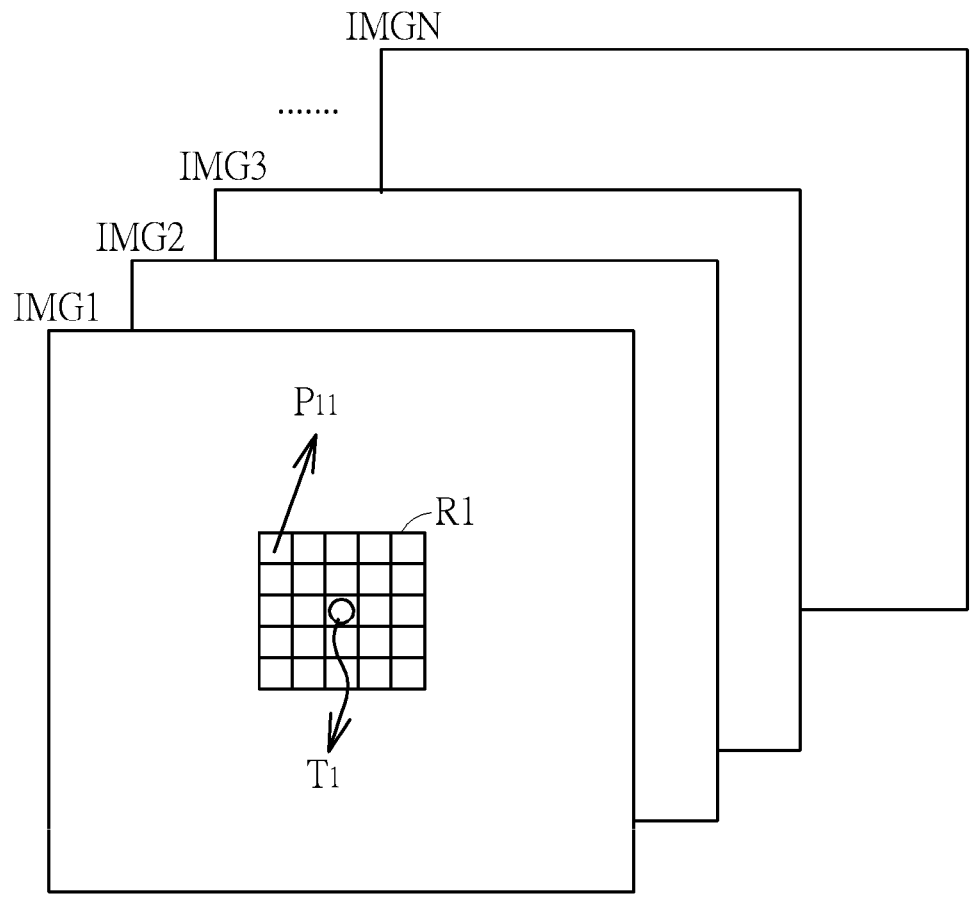
FIG. 3 illustrates an exemplary diagram of the temporal analysis utilized in the color sampling methods.
Figure 4:
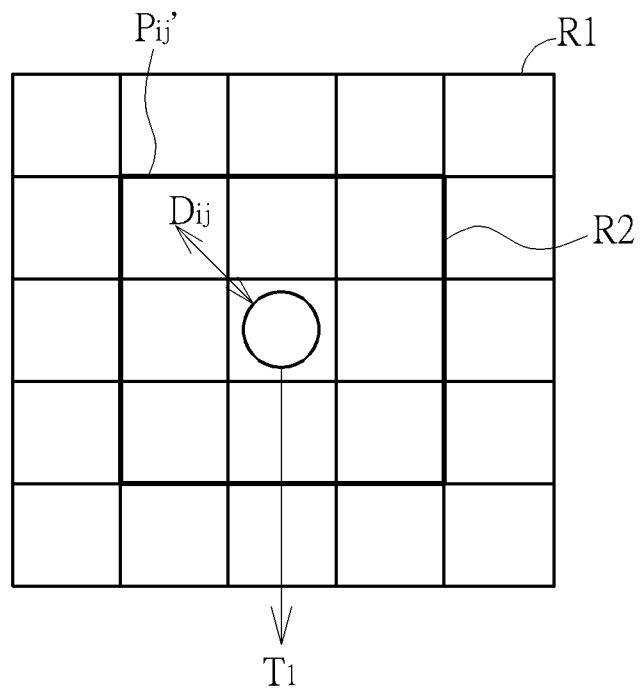
FIG. 4 illustrates an exemplary diagram of the spatial analysis utilized in the color sampling methods.

Please also refer to FIG. 3 and FIG. 4. FIG. 3 illustrates an exemplary diagram of the temporal analysis. FIG. 4 illustrates an exemplary diagram of the spatial analysis. As shown in FIG. 3, a plurality of image frames IMG1~IMGN are received from the image senor unit. A touch input is received by the touch screen. Assume position of the touch input is determined as T1, a first region R1 is determined according to position T1, which may be center of the first region R1. In the embodiment of FIG. 3, the size of the first region is 5×5, and each of the pixels is labeled as Pij. For a given pixel, such as P11, the representative color value C11 is determined by performing calculation on color values of P11 in the plurality of image IMG1~IMGN. Consequently, a plurality of representative color values Cij can be thus determined. The temporal analysis is performed accordingly.

In FIG. 4, a second region R2 within the first region R1 is determined. In the embodiment of FIG. 4, the size of the second region R2 is 3×3, and each of the pixels Pij' within the second region is assigned with corresponding representative color values. The weight values of the pixels within the second region R2 is determined according to the distance of the pixels to the position T1 . For example, the weight value is determined by the absolute distance Dij of the pixel Pij' to the position T1, which is at pixel P33'. The candidate color value is then calculated by the weighted average of the pixels Pij' and the distances Dij.

Note that in some embodiments of the present invention, the size of the first region R1 is no larger than the size of the second region R2, i.e. the number of pixels covered by the first region R1 is no more than the number of pixels covered by the second region R2, for exploiting the advantage of using the temporal analysis with a smaller processed data amount and for exploiting the advantage of the pixel locality on the digital photo while performing the spatial analysis.

Note that the temporal analysis may be replaced by other temporal analyses for sampling in some embodiments of the present invention. Similarly, the spatial analysis may also be replaced by other spatial analyses for sampling in some embodiments of the present invention.

Figure 5:
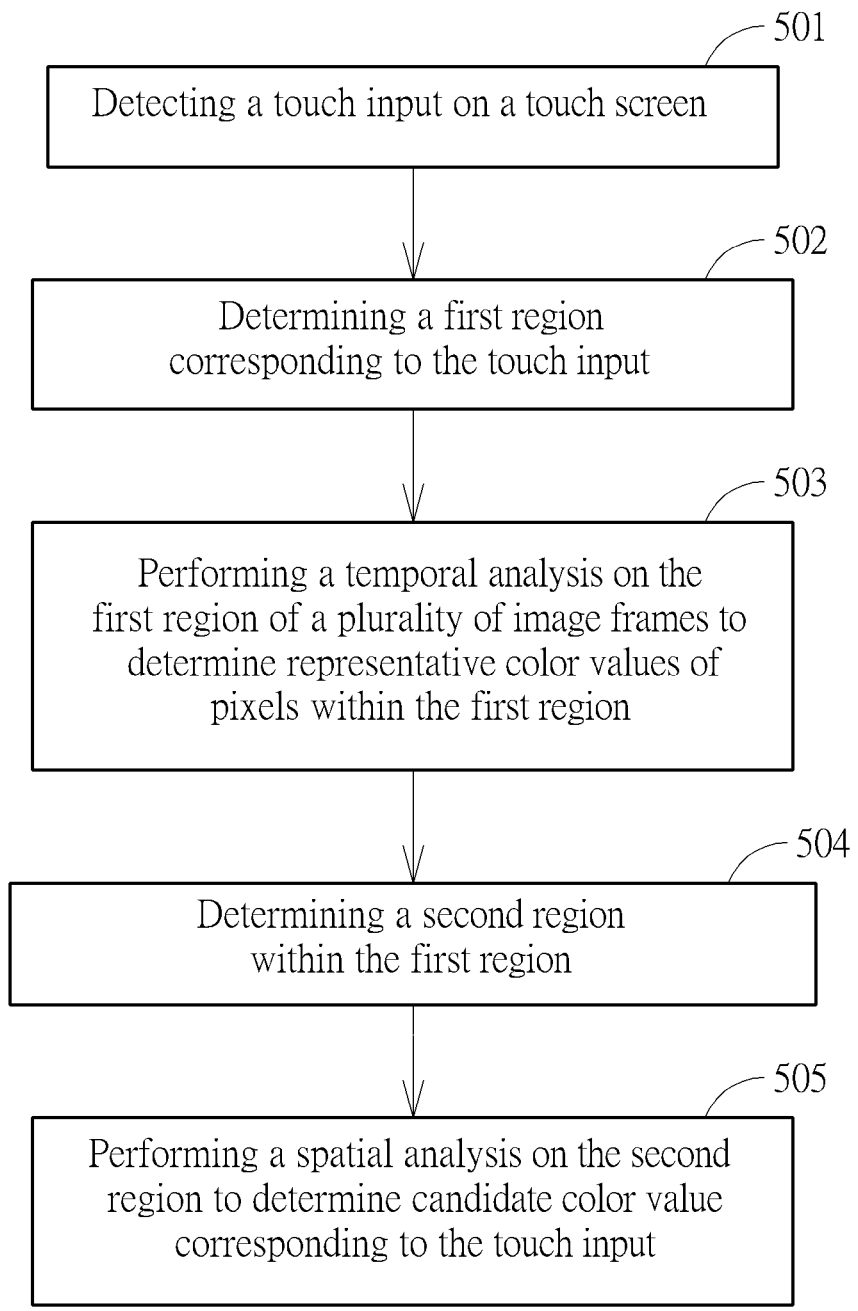

Please refer to FIG. 5, which illustrates the color sampling method according to one embodiment of the present invention. As shown in FIG. 5, the color sampling method includes steps as the following:

Step 501: Detecting a touch input on a touch screen. As described above, the touch screen 110 detects contact of finger, stylus and/or other tools on the touch screen 110, and transmits related information to the image processing unit 130. The touch input information may be further processed by other processing unit, such as application processor (not shown) prior to transmitting to the image processing unit 130. And the touch input information may comprise position of the touch input and/or corresponding operation.

Step 502: Determining a first region corresponding to the touch input. The image processing unit 130 determines a first region according to the position information. A reference position may be determined according to the position information. The image processing unit 130 may determine the first region by selecting a region of a predetermined size centered at the reference position.

Step 503: Performing a temporal analysis on the first region of a plurality of image frames to determine representative color values of pixels within the first region, the image frames being received during a predetermined time period when detecting the touch input. To filter out noise, temporal analysis is performed on a plurality of image frames, which may be captured consecutively over a predetermined time period. The time period covers the time point that the touch input is detected. For each pixel within the first region, a representative color value is determined by performing calculations on corresponding pixels located at the same position within the plurality of image frames.

Step 504: Determining a second region within the first region. To perform spatial analysis, the image processing unit 130 selects a smaller region within the first region. The second region is also centered at the reference position and be determined by a predetermined size.

Step 505: Performing a spatial analysis on the second region to determine candidate color value corresponding to the touch input according to the representative color values of pixels within the second region. In the spatial analysis, the image processing unit 130 performs calculation on pixels within the second region according to the representative color values determined by temporal analysis. Each of the representative color value is given a weight value according to the distance of the pixel to the reference position, and a weighted average of the representative color values is calculated as the candidate color value. The resulting candidate color value indicates the color corresponds to the touch input.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A color sampling method, comprising:
  detecting a touch input on a touch screen;
  receiving a plurality of image frames;
  determining a first region corresponding to the touch input;
  determining representative color values of pixels within the first region according to color values of corresponding pixels located at the same positions within the plurality of image frames;
  determining a second region within the first region, the first region and the second region being centered to position of the touch input;
  applying weights to pixels within the second region according to a distance of the pixels to the touch input, the pixels within the second region being more than one pixel;

determining a candidate color value corresponding to the touch input according to the weights and the representative color values within the second region; and performing a color adjustment on pixels having color values equal or similar to the candidate color value.

2. The color sampling method of claim 1, wherein determining of the representative color value of the pixels within the first region further comprises performing a calculation on color values of corresponding pixels located at the same position within the plurality of image frames, wherein the calculation is selected from average calculation, medium calculation and mean calculation.

3. The color sampling method of claim 2, wherein the plurality of image frames are obtained during a predetermined time period upon receiving the touch input.

4. The color sampling method of claim 1, further comprises determining a reference position of the touch input within the image frames; and wherein the distance relationship is determined according to the distance of the pixels to the reference position.

5. The color sampling method of claim 1, further comprises:

identifying an object corresponding to the touch input;

adjusting the candidate color value; and applying the adjusted candidate color value to the object.

6. A color sampling method, comprising:

detecting a touch input on a touch screen;

determining a first region corresponding to the touch input;

performing a temporal analysis on the first region of a plurality of image frames to determine representative color values of pixels within the first region, the image frames being received during a predetermined time period upon detecting the touch input;

determining a second region within the first region, the first region and the second region being centered to position of the touch input;

performing a spatial analysis on the second region to determine a candidate color value corresponding to the touch input according to the representative color values of pixels within the second region, the pixels within the second region being more than one pixel; and performing a color adjustment on pixels having color values equal or similar to the candidate color value.

7. The color sampling method of claim 6, wherein performing of the temporal analysis further comprises for each of the pixels within the first region, determining the representative color value of the pixel by calculating weighted average of color values of corresponding pixels located at the same position within a plurality of image frames.

8. The color sampling method of claim 7, further comprises:

determining a reference position corresponding to the touch input;

wherein the first region and the second region are determined according to the reference position and predetermined sizes.

9. The color sampling method of claim 8, wherein the second region is smaller than the first region.

10. The color sampling method of claim 6, wherein performing of the spatial analysis further comprises determining the candidate color value corresponding to the touch input by calculating a weighted average of the representative color values of the pixels within the second region.

11. The color sampling method of claim 10, wherein the weight average is calculated according to the distances of the pixels within the second region to a reference pixel, the reference pixel representing the touch input.

12. The color sampling method of claim 6, further comprises:

identifying an object corresponding to the touch input;

adjusting the candidate color value; and applying the adjusted candidate color value to the object.

13. A touch control device, comprising:

a touch screen, configured to receive and detect a touch input; and an image processing unit, coupled to the touch screen and configured to determine a first region and a second region centered to position of the touch input, determining representative color values of pixels within the first region using temporal analysis, determining a candidate color value corresponding to the touch input according to the representative color values of pixels within the second region using spatial analysis respectively, and performing a color adjustment on pixels having color values equal or similar to the candidate color value;

wherein the second region is a portion of the first region, the first region and the second region being centered to position of the touch input, the pixels within the second region being more than one pixel.

14. The touch control device of claim 13, wherein the image processing unit is further configured to perform the temporal analysis by, for each pixel within the first region, determining the representative color value of the pixel by calculating weighted average of color values of corresponding pixels located at the same position within a plurality of image frames obtained during a predetermined time period.

15. The touch control device of claim 13, wherein the image processing unit is further configured to perform the spatial analysis by determining the color value corresponding to the touch input by calculating a weighted average of the representative color values of the pixels in the second region, and wherein a weight of the pixels is calculated according to the distance of the pixels within the second region to a reference pixel, the reference pixel representing the touch input.

16. The touch device of claim 15, wherein the touch screen is further configured to determine a reference position of the touch input and the image processing unit is further configured to locate the first region and the second region around the reference position by predetermined sizes respectively.

* * * * *